(12) United States Patent
Pu et al.

(10) Patent No.: US 10,798,739 B2
(45) Date of Patent: Oct. 6, 2020

(54) ENHANCED LAA TRANSCEIVER WITH AID OF CARRIER SENSING FROM WIFI

(71) Applicant: APPLE INC., Cupertino, CA (US)

(72) Inventors: Tianyan Pu, Cupertino, CA (US); Prateek Sharma, San Jose, CA (US); Sami M. Almalfouh, San Jose, CA (US); Ping Wang, San Jose, CA (US); Wei Zhang, Santa Clara, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/129,237

(22) Filed: Sep. 12, 2018

(65) Prior Publication Data

US 2019/0104545 A1 Apr. 4, 2019

Related U.S. Application Data

(60) Provisional application No. 62/565,553, filed on Sep. 29, 2017.

(51) Int. Cl.
| | |
|---|---|
| *H04W 74/08* | (2009.01) |
| *H04W 72/12* | (2009.01) |
| *H04L 5/00* | (2006.01) |
| *H04W 52/02* | (2009.01) |
| *H04W 16/14* | (2009.01) |

(52) U.S. Cl.
CPC ........... *H04W 74/0808* (2013.01); *H04L 5/00* (2013.01); *H04W 72/1215* (2013.01); *H04W 16/14* (2013.01); *H04W 52/0209* (2013.01); *H04W 74/0816* (2013.01)

(58) Field of Classification Search
CPC .... H04L 5/00; H04W 16/14; H04W 72/1215; H04W 74/0808; H04W 74/0816; H04W 52/0209
See application file for complete search history.

(56) References Cited

U.S. PATENT DOCUMENTS

| | | | | |
|---|---|---|---|---|
| 2014/0287769 | A1* | 9/2014 | Taori | H04W 74/0808 455/450 |
| 2014/0341018 | A1* | 11/2014 | Bhushan | H04W 28/16 370/230 |
| 2015/0334752 | A1* | 11/2015 | Li | H04W 74/0816 455/418 |
| 2016/0095110 | A1* | 3/2016 | Li | H04W 72/1215 370/329 |
| 2017/0048041 | A1* | 2/2017 | Yi | H04W 8/005 |
| 2017/0055263 | A1* | 2/2017 | Tomeba | H04W 16/14 |

(Continued)

*Primary Examiner* — Benjamin H Elliott, IV
(74) *Attorney, Agent, or Firm* — Fay Kaplun & Marcin, LLP (57) ABSTRACT

A method is disclosed where a user equipment ("UE") is operating in a carrier aggregation mode and connected to a first cell operating on a licensed band and a second cell operating on an unlicensed band. The method may include the UE performing a carrier sensing operation on the unlicensed band, determining, from the carrier sensing operation, a duration that the unlicensed band will be occupied, refraining from transmitting data to the second cell on the unlicensed band for the duration that the unlicensed band will be occupied and setting a transmitter in communication with the second cell to a low power mode for the duration that the unlicensed band will be occupied.

13 Claims, 7 Drawing Sheets

(56) References Cited

U.S. PATENT DOCUMENTS

| | | | |
|---|---|---|---|
| 2017/0094546 A1* | 3/2017 | Chai | H04W 24/10 |
| 2017/0111889 A1* | 4/2017 | Li | H04W 74/08 |
| 2018/0027579 A1* | 1/2018 | Kalhan | H04W 76/14 |
| | | | 455/454 |
| 2018/0063817 A1* | 3/2018 | Chakraborty | H04W 74/0816 |
| 2018/0103398 A1* | 4/2018 | Jung | H04W 36/0055 |
| 2019/0104545 A1* | 4/2019 | Pu | H04W 72/1215 |

* cited by examiner

Device A    RTS         DATA

Device B         CTS              ACK

Device C    NAV TIMER

Device D    NAV TIMER

ENHANCED LAA TRANSCEIVER WITH AID OF CARRIER SENSING FROM WIFI

PRIORITY/INCORPORATION BY REFERENCE

This application claims priority to U.S. Provisional Application 62/565,553 entitled "Enhanced LAA Transceiver with Aid of Carrier Sensing from WiFi," filed on Sep. 29, 2017, the entirety of which is incorporated herein by reference.

BACKGROUND INFORMATION

Licensed Assisted Access uses carrier aggregation to combine LTE transmissions in the licensed spectrum with LTE transmissions in the unlicensed spectrum. The unlicensed spectrum, such as the 5 GHz spectrum, is shared between wireless communication devices using networks other than LTE, such as the wireless local access network using WiFi connections. To avoid interference and promote co-existence between the wireless communication devices sharing the unlicensed spectrum, a user equipment using Licensed Assisted Access may first check a desired channel on the unlicensed spectrum to determine whether the channel is busy or idle. This is known as the listen before talk protocol.

The listen before talk protocol is based on energy detection, which determines whether the power of a signal on the desired channel is above a threshold. However, energy based detection is unreliable and subject to certain kinds of interference. Further, energy based detection cannot determine how long the desired channel will remain busy. This may lead to transmission collisions on the unlicensed spectrum as well as causing the user equipment to inefficiently utilize its Licensed Assisted Access transmitter/receiver, which leads to transmission failures and poor battery performance.

SUMMARY

In some exemplary embodiments, a method is disclosed where a user equipment ("UE") is operating in a carrier aggregation mode and connected to a first cell operating on a licensed band and a second cell operating on an unlicensed band. The method may include the UE performing a carrier sensing operation on the unlicensed band, determining, from the carrier sensing operation, a duration that the unlicensed band will be occupied, refraining from transmitting data to the second cell on the unlicensed band for the duration that the unlicensed band will be occupied and setting a transmitter in communication with the second cell to a low power mode for the duration that the unlicensed band will be occupied.

In other exemplary embodiments, a user equipment (UE) is disclosed. The UE includes a transceiver and a cellular chip, wherein the transceiver and the cellular chip are configured to operate in a carrier aggregation mode where the UE connects to a first cell operating on a licensed band and a second cell operating on an unlicensed band. The UE further includes an Industrial, Scientific, and Medical (ISM) chip configured to perform a carrier sensing operation of the unlicensed band, wherein one of cellular chip or ISM chip is further configured to determine, based on information from the carrier sensing operation, a duration that the unlicensed band will be occupied, and wherein the cellular chip and transceiver refrains from transmitting data to the second cell on the unlicensed band for the duration that the unlicensed band will be occupied.

In still further exemplary embodiments, a method is disclosed where a primary cell serving a primary component carrier ("PCC") on a licensed band to a user equipment ("UE") and controlling a secondary cell serving a secondary component carrier ("SCC") to the UE on an unlicensed band. The method includes receiving carrier sensing information for the unlicensed band, determining, based on the carrier sensing information, a duration that the unlicensed band will be occupied and refraining from scheduling any transmissions by the second cell to the UE on the unlicensed band for the duration that the unlicensed band will be occupied.

DETAILED DESCRIPTION

The exemplary embodiments may be further understood with reference to the following description and the related appended drawings, wherein like elements are provided with the same reference numerals. The exemplary embodiments are related to a device, system, and method for enhancing Listen-before-Talk ("LBT") protocols used by a user equipment ("UE") and a base station.

Initially, it is noted that the exemplary embodiments are described with regard to Licensed Assisted Access ("LAA"). LAA refers to transmissions that are anchored to a primary component carrier, operating on a licensed spectrum, where a secondary component carrier may operate on an unlicensed spectrum in a carrier aggregation framework. The unlicensed spectrum (e.g., 2.4 GHz, 5 GHz) is primarily used for WiFi connections and transmissions. As such, the unlicensed spectrum is shared between wireless communication devices using a wireless local access network ("WLAN"), such as WiFi or Bluetooth, and wireless communication devices using an LTE network with LAA capabilities. This may cause potential interference between the wireless communication devices sharing the unlicensed spectrum as both networks may transmit on the same frequency at the same time. To remedy this issue, wireless communication devices operating on the LTE network in a LAA capacity may utilize LBT protocols to co-exist with wireless communication devices operating on the WLAN. The LBT protocols may enable a wireless communication device to detect whether a desired channel of the unlicensed spectrum is occupied prior to transmitting any data on the desired channel.

Current LBT protocols are based on energy detection. For example, an LTE-LAA capable device may determine whether the signal strength of a signal detected on the desired unlicensed channel exceeds a predetermined threshold. When the signal strength exceeds the predetermined threshold, the desired channel may be declared busy. Otherwise, when the signal strength does not exceed the predetermined threshold, the desired channel may be declared idle and suitable for transmission.

However, energy detection based LBT protocols have significant deficiencies. In a first example, energy detection based LBT protocols are not robust against all kinds of interference and, in particular, are very susceptible to narrow band interference and spurious emissions. The interference may cause an increase or decrease of signal power, which may cause the signal to inadvertently cross or fail to cross the predetermined threshold. This may, in turn, produce an erroneous indication as to whether a channel is busy or idle.

In a second example, energy detection based LBT protocols cannot predict how long a medium may be occupied, which means that energy detection based LBT protocols are not predictive. This may result in the UE operating its LAA transceiver at a higher power (e.g., high power mode) than is necessary for a duration where the unlicensed channel is busy. In a third example, energy detection based LBT protocols make it difficult to set thresholds to balance between misdetection and false alarm rates.

The exemplary embodiments provide a first mechanism to enhance LBT protocols by using carrier sense. Carrier sense or carrier sensing, as will be described in more detail below, is a protocol in which a device listens to a shared medium (e.g., listening for wireless signals on a band/channel of the unlicensed spectrum) to determine whether another device is transmitting on that medium. It should be understood by those skilled in the art that the terms "medium," "channel" and "band" refer to a frequency range of the radio frequency spectrum, which includes the licensed and unlicensed spectrums, and the terms may be used interchangeably to describe a frequency range.

Further, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to perform certain operations such as transmitting, receiving, etc. Therefore, the UE as described herein is used to represent any electronic component.

Additionally, it is noted that the exemplary embodiments are described with regard to the cellular network being a Long Term Evolution ("LTE") network. The LTE network will be described as having LAA functionality that utilizes the unlicensed spectrum (e.g., 5 GHz) to exchange data with the UE. Those skilled in the art would understand that LAA is a subset of Carrier Aggregation ("CA"). With CA, the UE may associate with a network component that serves as a primary serving cell ("PCell") and at least one further network component that serves as a secondary serving cell ("SCell"). The PCell may control how data is exchanged between the UE and the network corresponding to the PCell. When the UE is CA capable, CA functionality enables the PCell and a further SCell to combine bandwidths to exchange data with the UE. Thus, the PCell may provide a first portion of a total bandwidth for data to be exchanged while the SCell may provide a second portion of the total bandwidth. With LAA, the PCell provides a first portion of the total available bandwidth in the licensed spectrum and at least one SCell provides a further portion of the total available bandwidth in the unlicensed spectrum (e.g., 5 GHz). Those skilled in the art will understand that the exemplary embodiments may utilize a PCell and any number of SCells for CA functionality. However, the exemplary embodiments may be applied to any network that includes functionalities similar to CA and/or LAA as provided by the LTE network.

The exemplary embodiments further relate to a scenario where a LAA SCell may utilize a 5 GHz band in the unlicensed spectrum to exchange data between an eNB and a UE. As mentioned above, current protocols for determining whether a channel in the unlicensed spectrum is busy or idle can cause interference on the channel as well as unnecessarily drain a UE's battery. Accordingly, the exemplary embodiments address these deficiencies. However, and again, it should be noted that reference to specific bands (e.g., 2.4 GHz and 5 GHz), specific networks (e.g., LTE) and specific base stations (e.g., eNB) is merely for illustrative purposes. The exemplary embodiments may apply to any scenario where wired or wireless communication devices utilize the same frequency simultaneously.

Figure 1:
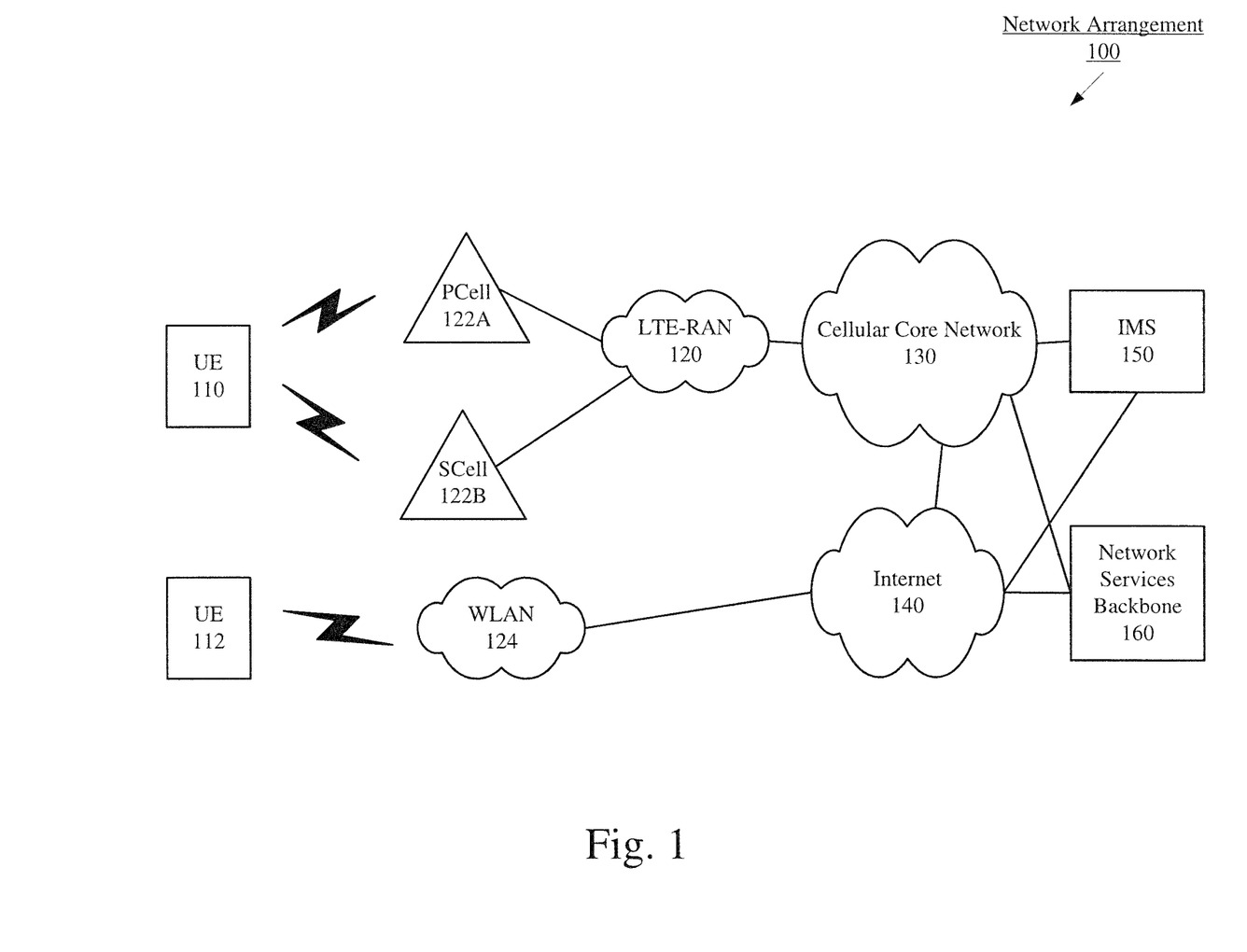
FIG. 1 shows a network arrangement according to various exemplary embodiments described herein.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate directly with one or more networks. The exemplary embodiments will be described with regard to the network being an LTE radio access network (LTE-RAN 120) that has LAA functionality. However, the use of an LTE-RAN 120 is merely exemplary and the exemplary embodiments may apply to any network that may utilize LAA (e.g. 5G New Radio) to communicate with the UE 110 or any network that may communicate with the UE 110 in the unlicensed spectrum. It should further be understood that the UE 110 may also communicate with other types of networks (e.g., legacy radio access networks ("RAN"), wireless local access networks ("WLAN"), such as WLAN 124, etc.) and the UE 110 may also communicate with networks over a wired connection. With regards to the exemplary embodiments, the UE 110 may establish a connection with the LTE-RAN 120. For example, the UE 110 may have an LTE chipset and communicate with the LTE-RAN 120 via a base station.

The LTE-RAN 120 is a portion of cellular networks that may be deployed by cellular providers (e.g., Verizon, AT&T, Sprint, T-Mobile, etc.). The LTE-RAN 120 may include, for example, base stations (e.g., Node Bs, eNodeBs, HeNBs, eNBS, small cells, femtocells, picocells, microcells, etc.) that are configured to send and receive traffic from UEs that are equipped with the appropriate cellular chip set.

The UE 110 may connect to the LTE-RAN 120 via a PCell 122A. Those skilled in the art will understand that any association procedure may be performed for the UE 110 to connect to the LTE-RAN 120 via the PCell 122A. For example, as discussed above, the LTE-RAN 120 may be associated with a cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate the PCell 122A. Those skilled in the art will understand that when first connecting to the LTE-RAN 120, CA may not be activated. Thus, the PCell 122A may just be referred to as a cell, because there are no other secondary cells active at this time.

The PCell 122A may control the mechanism used in exchanging data, particularly how data is transmitted to and received by the UE 110. When the UE 110 is carrier aggregation ("CA") capable, CA functionality enables the PCell 122A to combine bandwidths with at least one further cell to exchange data with the UE 110. The PCell 122A may be any type of cell that communicates with the UE 110 in the licensed spectrum. Thus, with CA the PCell 122A may provide a first portion of a total bandwidth for data to be exchanged while the at least one further SCell 122B may provide a second portion of the total bandwidth.

The network arrangement 100 may utilize LAA. Those skilled in the art would understand that LAA is a type of CA where the at least one further cell (e.g., SCell 122B) operates in the unlicensed spectrum. For example, the PCell 122A may operate in the licensed spectrum and may provide a first bandwidth to the UE 110 while the SCell 122B may operate in the unlicensed spectrum and may provide a second bandwidth to the UE 110. Thus, the PCell 122A provides the first bandwidth in the licensed spectrum and the SCell 122B provides the second bandwidth in the unlicensed spectrum to provide the total available bandwidth for the UE 110. It is important to note that reference to a single SCell 122B is merely exemplary and LAA functionality may include multiple SCells operating on any combination of the licensed or unlicensed spectrum. Thus, the network arrangement 100 may include the SCell 122B operating in the unlicensed spectrum and may include a plurality of further SCells operating in either the licensed or unlicensed spectrum. Additionally, it is important to note that LAA functionality may be performed in both the uplink and the downlink between the UE 110 and the LTE RAN 120. Thus, the UE 110 may communicate with the SCell 122B in the unlicensed spectrum in both the uplink and downlink.

As discussed above, the SCell 122B may be a cell capable of operating in the unlicensed spectrum, such as a small cell, a femtocell, a picocell, a microcell etc. Thus, the SCell 122B may be any type of cell that may communicate with the UE 110 in the unlicensed spectrum. Utilizing LAA, the SCell 122B may communicate over the 5 GHz band in the unlicensed spectrum. It should also be noted that a single base station may include the PCell 122A and the SCell 122B. Further, the SCell 122B may also be part of another base station that does not include the PCell 122A or a stand-alone device.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may also include a further UE 112 connected to the WLAN 124. The WLAN 124 may include any type of wireless local area network (WiFi, Hot Spot, IEEE 802.11x networks, etc.). Those skilled in the art would understand that the UE 112 may communicate with the WLAN 124 over the unlicensed spectrum (e.g., 5 Ghz).

Figure 2:
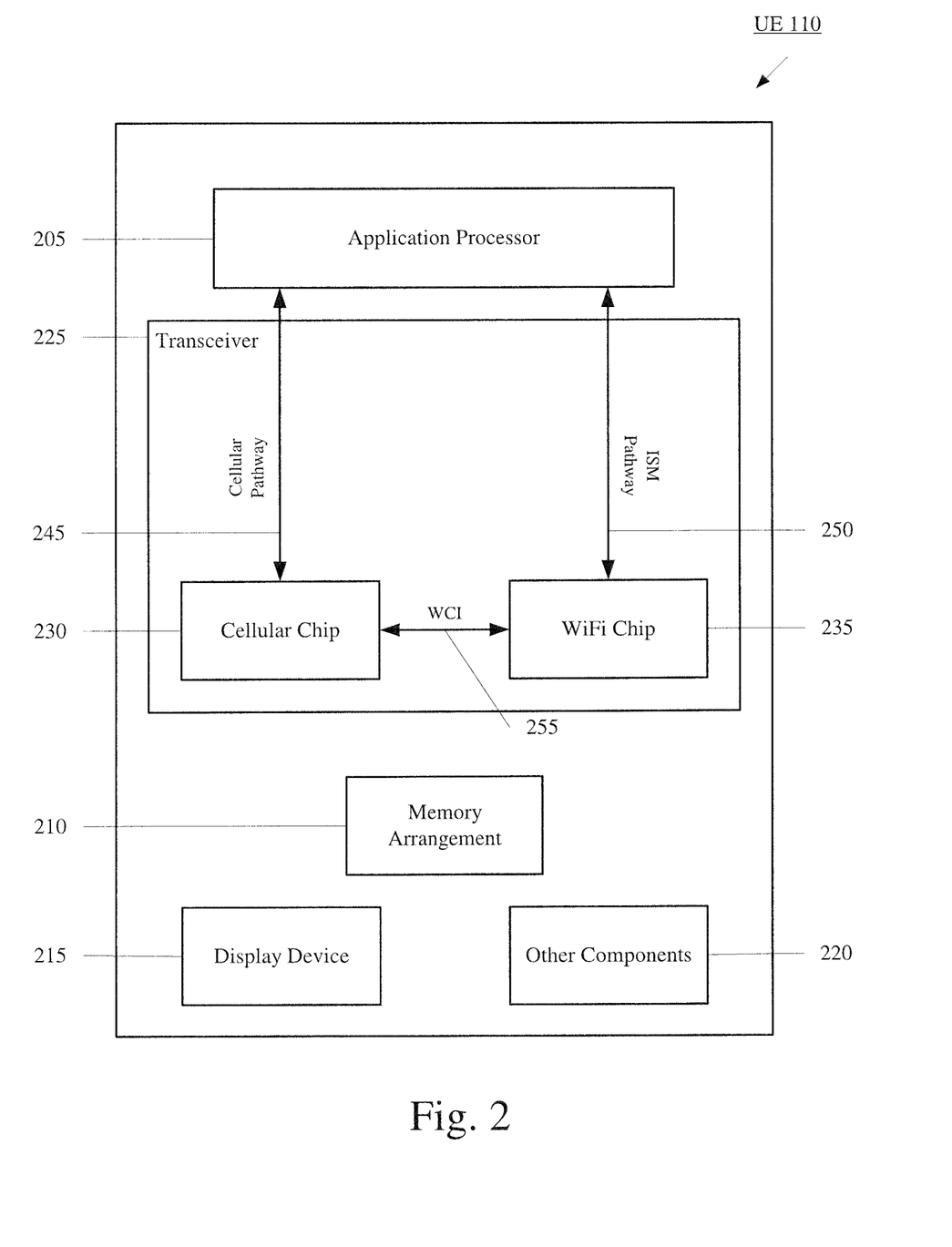
FIG. 2 shows a user equipment according to various exemplary embodiments described herein.

FIG. 2 shows an exemplary UE 110 according to various exemplary embodiments. The UE 110 may be any type of electronic component that is configured to communicate via a network, e.g., mobile phones, tablet computers, desktop computers, smartphones, phablets, embedded devices, wearables, Internet of Things (IoT) devices, etc. The UE 110 may be configured to communicate wirelessly using a variety of different frequencies. That is, the UE 110 includes components corresponding to the various frequencies and wireless communications networks in which the wireless communication is to be performed. Accordingly, the UE 110 is configured to enable coexistence between multiple wireless technologies within a single device. The UE 110 may include an application processor 205, a memory arrangement 210, a display device 215, other components 220, and a transceiver 225.

The processor 205 may be configured to execute a plurality of applications of the UE 110. It should be noted the applications (e.g., programs) executed by the processor 205 are only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE.

The memory 210 may be a hardware component configured to store data related to operations performed by the UE 110. Specifically, the memory arrangement 210 may store wireless operation data (e.g., frequencies in which the chips operate). The display device 215 may be a hardware component configured to show data to a user. The other components 220 may include a at least one antenna, a power supply, an input/output device, etc.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies that are related to a cellular network and a WiFi network. The transceiver 225 may also perform wireless functionalities for short range communications such as Bluetooth. Accordingly, the transceiver 225 may include a cellular chip 230 for the wireless functionalities related to the cellular network. The transceiver 225 may further include a WiFi chip 235 for the wireless functionalities related to the WiFi network. Thus, the WiFi chip 235 may operate in the Industrial, Scientific, and Medical (ISM) band. The exemplary embodiments will be described with regard to the WiFi chip 235 operating in the 2.4 GHz ISM band and in the 5 GHz ISM band. However, reference to the 2.4 GHz band and the 5 GHz band is merely for illustrative purposes and the WiFi chip 235 may utilize any portion of the ISM band.

The transceiver 225 may further include one or more transmitters and one or more receivers. Each of the transmitters and each of the receivers may possess or be assigned different functionalities for transmitting and receiving. In an exemplary embodiment, a first transmitter/receiver may be assigned to transmitting and receiving to and from the PCell 122A on the licensed spectrum while a second transmitter/receiver may be assigned to transmitting and receiving from the SCell 122B on the unlicensed spectrum. In the exemplary embodiments discussed below, the transmitter/receiver assigned to transmitting and receiving to and from the PCell 122A may be referred to as the LTE transceiver/receiver and the transmitter/receiver assigned to transmitting and receiving to and from the SCell 122B may be referred to as the LTE-LAA transceiver/receiver. It should be understood that the transceiver 225 may have any number of transmitters and receivers with any number of functionalities and for any number of purposes.

The components of the UE 110 may be disposed as an integrated circuit board (IC). Accordingly, the cellular chip 230, the WiFi chip 235, and the application processor 205 may be disposed as an IC in which pathways may also exist between these components. For example, a cellular pathway 245 may be disposed to connect the cellular chip 230 to the application processor 205 while a WiFi pathway 250 may be disposed to connect the WiFi chip 235 to the application processor 205. In another example, a WCI pathway 255 may be disposed to connect the cellular chip 230 to the WiFi chip 235. Those skilled in the art will understand the manner in which the cellular chip 230, the WiFi chip 235, and the application processor 205 may be disposed on the IC as well as the manner in which the pathways 245, 250, 255 may be provided for the interconnections. Therefore, the pathways 245, 250, 255 provide an exemplary respective manner for data to be exchanged between the components of the UE 110. It should be understood by those skilled in the art that the cellular chip 230 and the WiFi chip 235 do not have to be part of the transceiver 225.

As discussed above, the transceiver 225 may operate on a variety of different frequencies. The cellular chip 230 may provide functionalities related to the cellular network (e.g., LTE-RAN 120). With LAA, the cellular chip 230 may utilize the 5 GHz band in the unlicensed spectrum for communication with the network. The WiFi chip 235 may provide functionalities related to a WiFi network (e.g., WLAN 124).

The Wireless Coexistence Interface (WCI) pathway 255 may transmit messages between the cellular chip 230 and the WiFi chip 235. In this example, a direct connection is established between these components for the messages to be exchanged. The messages may be WCI-2 messages and may relate to information corresponding to the operations of the cellular chip 230 and the WiFi chip 235. Those skilled in the art will understand that WCI is one example of an interface that can be used to facilitate communication between the cellular chip 230 and the WiFi chip 235. Therefore, the exemplary embodiments may apply to any type of interface that may exchange information between the cellular chip 230 and the WiFi chip 235.

Figure 7:
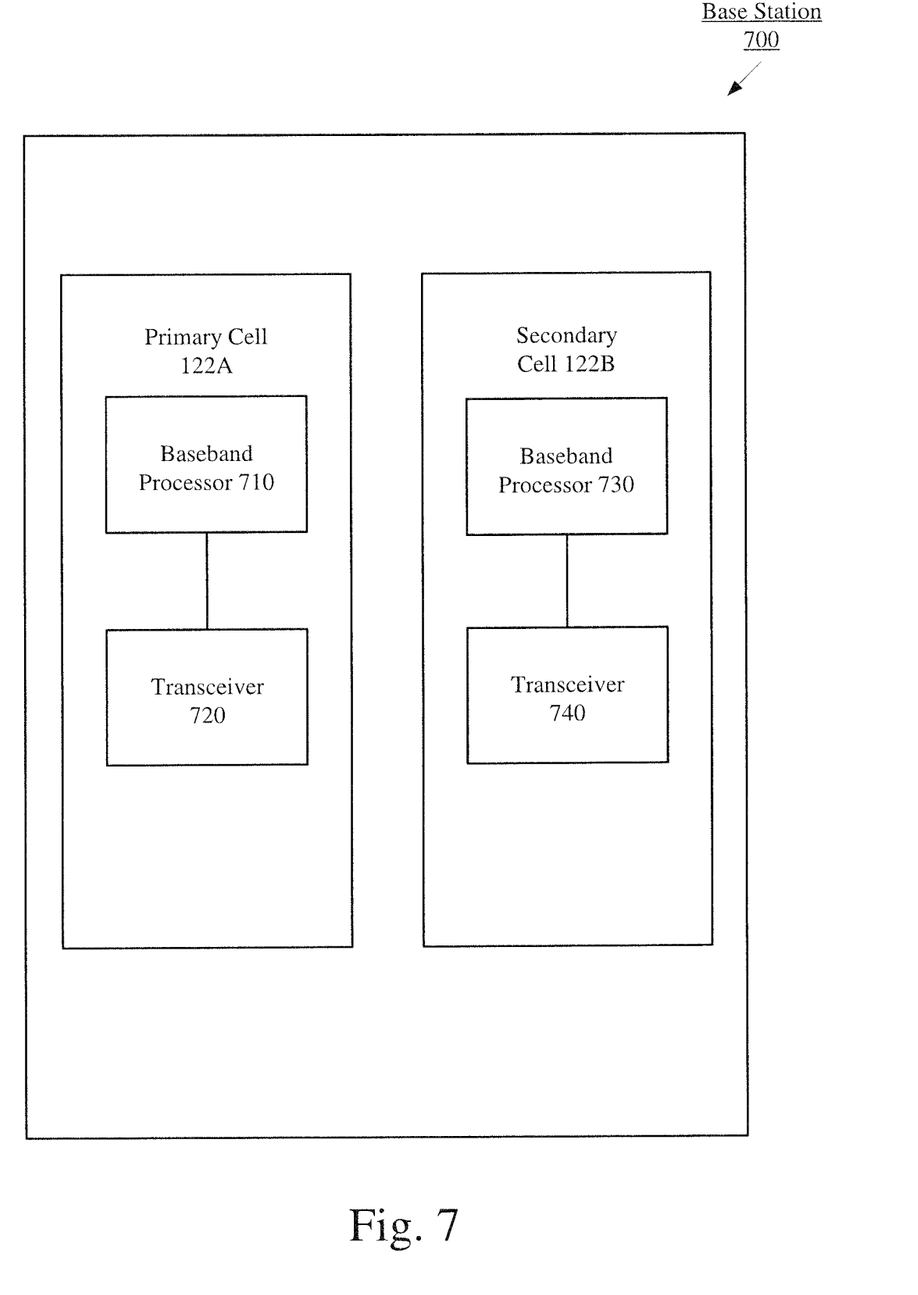
FIG. 7 shows a base station according to various exemplary embodiments described herein.

FIG. 7 shows a base station 700 according to various exemplary embodiments described herein. In this example, the base station 700 includes both the primary cell 122A and the secondary cell 122B described with reference to the network arrangement 100. However, this is only exemplary, as the primary cell 122A and the secondary cell 122B may be included in separate base stations, may be stand-alone devices, etc.

Each of the cells 122A and 122B of the base station 700 may include a baseband processor 710, 730, respectively, and a transceiver 720, 740, respectively. Those skilled in the art will understand that the cells 122A and 122B may also include other components, such as, a memory arrangement, a display device, a power supply, input and output connections, antenna arrangements, etc.

The baseband processors 710 and 730 may be configured to execute, at least, functionalities described herein for the cells 122A and 122B. These functionalities may be implemented as applications (e.g., programs) executed by the baseband processors 710 and 730, may be implemented via a separate incorporated component or may be a modular component, e.g., an integrated circuit with or without firmware. For example, the integrated circuit may include input circuitry to receive signals and processing circuitry to process the signals and other information. The exemplary embodiments may be implemented in any of these or other configurations of a cell.

The transceivers 720 and 740 may be a hardware components configured to transmit and/or receive data. That is, the transceiver 225 may enable communication with other electronic devices (e.g., the UE 110) directly or indirectly through a network based upon an operating frequency of the network. The transceiver 225 may operate on a variety of different frequencies that are related to the cellular network. As described above, in this exemplary embodiment, the transceiver 720 of the primary cell 122A is capable of communicating via the licensed band and the transceiver 740 of the secondary cell 122B is capable of communicating via the unlicensed band.

Carrier Aggregation

The UE 110 may be carrier aggregation ("CA") enabled. As discussed above, the CA enabled network may include a primary serving cell (e.g., the PCell 122A) serving a primary component carrier (PCC) to the UE 110 and at least one secondary serving cell (e.g., the SCell 122B) serving a secondary component carrier (SCC) to the UE 110. For example, the UE 110 may associate with a network component (e.g., an eNB) which serves as the PCell 122A. The PCell 122A may control the manner in which data is exchanged with the UE 110 such as determining when uplink and downlink grants are given for the UE 110. The PCell 122A may also control the mechanism used in exchanging data, particularly how data is transmitted to and received by the UE 110. When the UE 110 is CA capable, CA functionality enables the PCell 122A and the SCell 122B to combine bandwidths to exchange data with the UE 110. The SCell 122B may also be configured and activated based on throughput requirements. Thus, with CA, the PCell 122A may provide a first portion of a total bandwidth for data to be exchanged while the SCell 122B may provide a second portion of the total bandwidth. A PCell and a single SCell may be termed a double CA combination (two carriers) and may be utilized to provide the total available bandwidth. To further increase the total available bandwidth for data to be exchanged with the UE, an additional SCell may be incorporated. A PCell and two SCells may be termed a triple CA combination and may be utilized to provide the total available bandwidth. A PCell and three SCells may be termed a quadruple CA combination and may also be utilized to provide the total available bandwidth.

Using the CA functionality, a base station (e.g., eNB) may serve as the PCell 122A and any or all of the SCells (e.g., 122B). Alternatively, the base station may serve as the PCell 122A while one or more further base stations may serve as the one or more SCells. For example, in a triple CA combination, a first base station may serve as the PCell 122A and a first SCell 122B and a second base station may serve as a second SCell.

Carrier Sense

A WiFi network (e.g., WLAN 124) does not reserve resources to facilitate communications. In particular, the WiFi network does not pass tokens, reserve a medium with bit-mapping or use other control mechanisms to dictate which stations may have access to transmit. As such, to avoid transmission interference or collision between multiple wireless devices, the WiFi network may implement carrier sense. Carrier sense is a protocol in which a wireless device listens to a shared medium (e.g., listening for wireless signals on the unlicensed spectrum) to determine whether the channel is busy or idle.

A first function of carrier sense may be Clear Channel Assessment ("CCA"). CCA is a physical carrier sensing mechanism that listens to a received energy on a channel to determine whether the channel is idle or busy. For example, if the received energy, which may relate to a transmission power of a signal being transmitted on the channel, exceeds a predetermined threshold, the channel may be determined to be busy. However, if the received energy does not exceed a predetermined threshold, the channel may be determined to be idle. Alternatively, CCA may detect and decode transmissions on the channel to determine whether the channel is busy. This will be described in more detail below.

When the channel is determined to be idle, a virtual carrier sensing Request to Send/Clear to Send ("RTS/CTS") protocol may be used as a further collision avoidance mechanism. The RTS/CTS protocol is a handshake between a source device and a destination device. In particular, the source device may transmit an RTS frame over a channel to the destination device. The destination device may then respond by transmitting a CTS frame indicating that the channel is clear in the area of the destination device. The RTS frame and the CTS frames each contain a duration field, which may be encoded. The duration fields of the RTS frame and the CTS frame include the duration of the planned exchange between the source device and the destination device, which may account for the transmission of data, the transmission of an acknowledgement ("ACK") and any other data. The duration required for appropriate spacing of the transmissions may also be predefined in a Specification (e.g., 3rd Generation Partnership Project (3GPP) Technical Specification (TS)). The duration fields may also be used in another function of carrier sense called Network Allocation Vector ("NAV").

NAV is a virtual carrier sensing mechanism which may be used by a wireless device, such as the UE 110 or the PCell 122A, to set how long a medium will remain busy. Specifically, the UE 110 and/or the PCell 122A may snoop the RTS/CTS packets exchanged between the source device and the destination device via CCA or another method. The UE 110 and/or the PCell 122A may then be able to extract a duration of how long the medium will remain busy and set a NAV timer value (e.g., a counter) reflecting the duration. During the duration, the UE 110 and/or the PCell 122A may avoid transmitting on the busy channel.

It should be understood by those skilled in the art that other virtual carrier sensing mechanisms or protocols may be used. For example, a CTS-to-self protocol may be used as a collision avoidance mechanism. Specifically, the CTS-to-self protocol may involve a wireless communication device transmitting a CTS frame to itself. The CTS frame, as discussed above, may have a duration field which may be used in the NAV mechanism.

Figure 3:
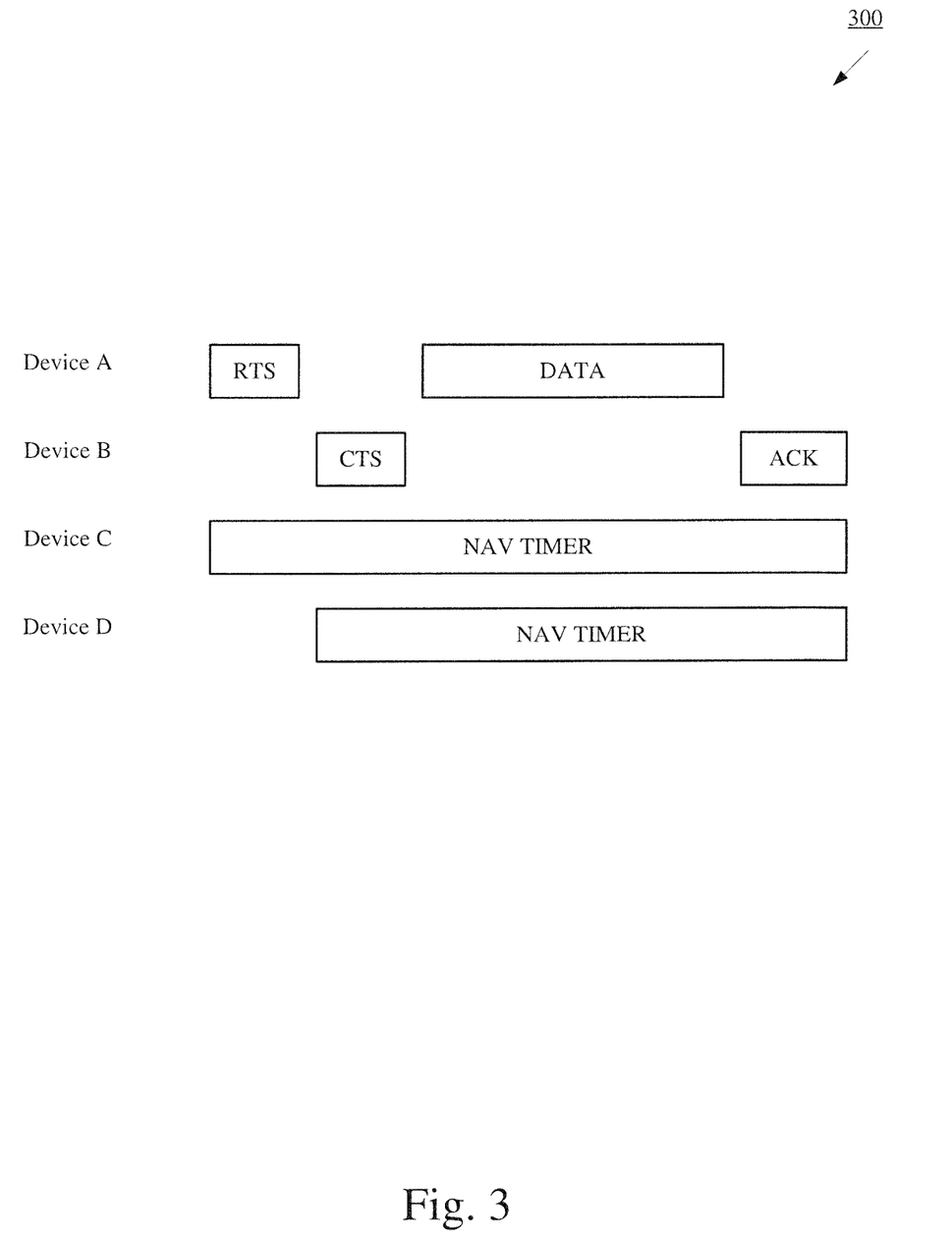
FIG. 3 shows an example of carrier sensing related to four devices according to various exemplary embodiments described herein.

FIG. 3 shows an exemplary embodiment of carrier sensing related to four devices. In this example, it may be considered that the device A is the UE 112 that communicates in the unlicensed band with the device B that may be, for example, an access point of the WLAN 124. The device C may be the UE 110 that is configured to communicate with the LTE-RAN 120 via PCell 122A using the licensed band and via SCell 122B using the unlicensed band. For the purposes of this example, it may be considered that the PCell 122A is the device D and it has the ability, either directly or indirectly, to sense in the unlicensed band.

The device A (e.g., UE 112) may transmit an RTS frame to the device B on a channel in the unlicensed band. The device C (e.g., UE 110) may snoop the RTS frame, decode and read the duration field of the RTS frame, and set a NAV timer value indicative of the duration field of the RTS frame. The device B, upon reception of the RTS frame, may transmit a CTS frame to the device A. The device D (e.g., PCell 122A) may also snoop the CTS frame, decode and read the duration field of the CTS frame, and set a NAV timer value indicative of the duration field of the CTS frame. Accordingly, while device A transmits data to device B over the channel, and device B transits an ACK to device A over the channel, devices C and D will know the duration that the channel is to remain busy and may refrain from using on the channel based on this information. It should be understood by those skilled in the art that carrier sensing, as discussed in this disclosure may relate to virtual carrier sensing, such as the CTS/RTS protocol, and physical carrier sensing, such as CCA.

Methods

Figure 4:
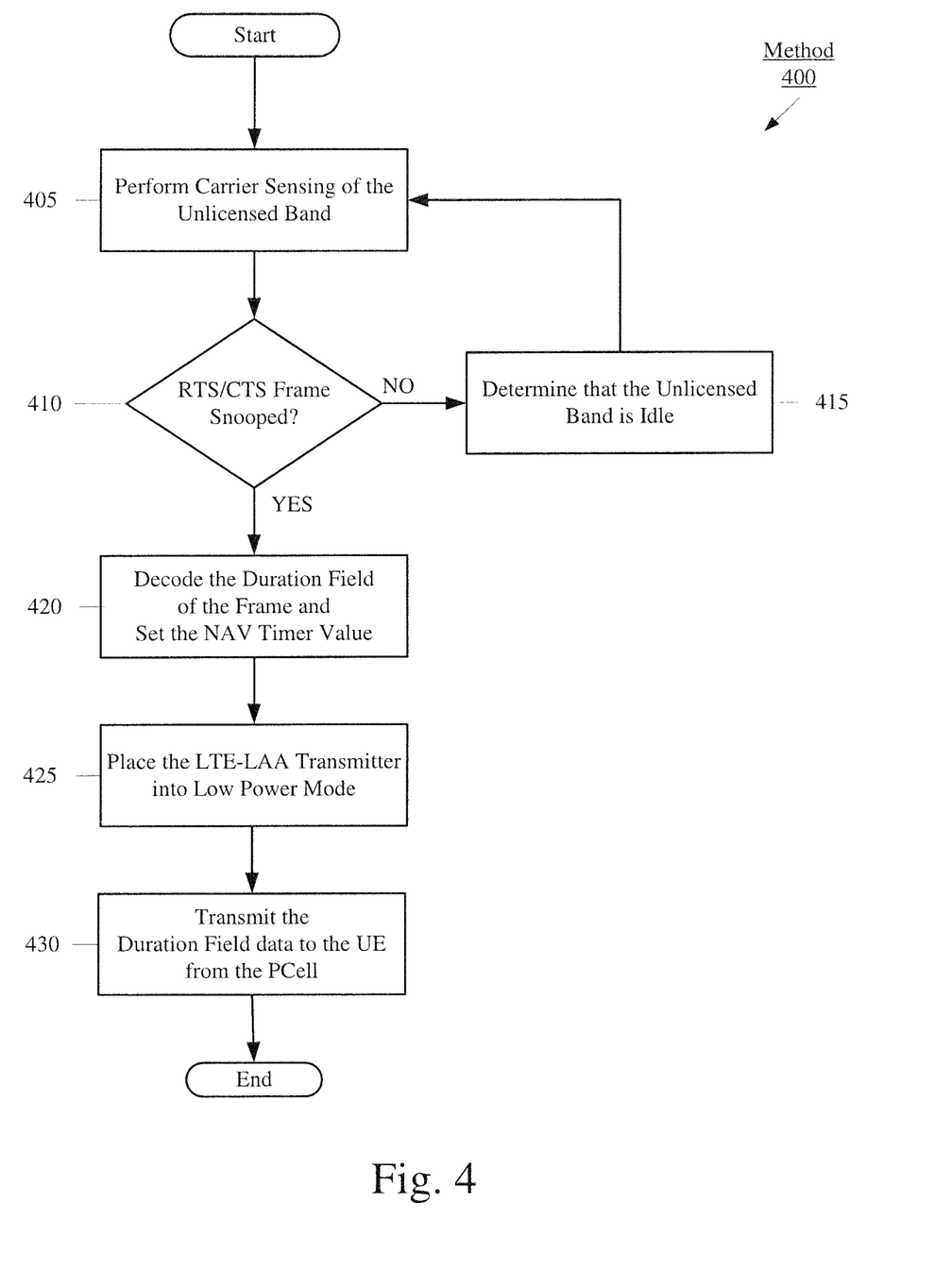
FIG. 4 shows a method of the eNB using carrier sensing to enhance LBT functions according to various exemplary embodiments described herein.

FIG. 4 shows a method 400 of the PCell 122A using carrier sensing to enhance LBT functions according to various embodiments described herein. In the exemplary embodiment, the PCell 122A may be connected to the UE 110 on a band of the licensed spectrum, hereafter licensed band and the SCell 122B may be connected to the UE 110 on a band of the unlicensed spectrum, hereafter unlicensed band. It should be noted that the PCell 122A will perform the operations disclosed in method 400. However, one or more of the operations discussed in method 400 may be performed by the SCell 122B.

In 405, the PCell 122A may perform carrier sensing of the unlicensed band. In an exemplary embodiment, the PCell 122A may perform a CCA (clear channel assessment) of the unlicensed band. Specifically, the PCell 122A may snoop for RTS and CTS frames being transmitted by other wireless devices (e.g., UE 112) on a channel that the UE 110 is connected to the SCell 122B.

In a further exemplary embodiment, the PCell 122A may delegate the carrier sensing (e.g., snooping) to the SCell 122B. For example, the SCell 122B may perform the snooping of the unlicensed band and transmit information collected from the snooping to the PCell 122A. It should be understood that the PCell 122A may also delegate the snooping to a further cell or a companion access point ("AP"). For example, the PCell 122A may delegate the snooping to a femtocell located between the PCell 122A and the UE 110. This may allow for a better snoop of the area pertaining to both the PCell 122A and the UE 110. If another cell or AP is used for the sensing function, the results may be communicated to the PCell 122A via a universal asynchronous receiver-transmitter ("UART") or other type of communication.

In 410, the PCell 122A may determine whether an RTS or a CTS frame has been snooped. If no RTS or CTS frames has been snooped, the PCell 122A may proceed to 415 and determine that the unlicensed band is idle. As such, the PCell 122A may schedule transmissions for the UE 110 via the SCell 122B on the unlicensed band. The PCell 122A may then loop back to 405 to once again perform carrier sensing of the unlicensed band or receive carrier sensing information from the SCell 122B or other associated AP.

If an RTS or a CTS frame has been snooped, the PCell 122A may proceed to 420 and decode the duration field of the frame. The PCell 122A may then set a NAV timer value based on the duration field of the frame. As discussed above, the duration field may indicate how long the unlicensed band may remain busy and the NAV timer value may be set to correspond to this time. As such, the PCell 122A may not schedule transmissions on the unlicensed band via the SCell 122B. It should be noted that the SCell 122B or other device, when performing the carrier sensing, may also perform the decoding and pass that decoded information to the PCell 122A.

Accordingly, in 425, the SCell 122B may place its LTE-LAA transmitter into low power mode for the duration of the NAV timer value because the PCell 122A will not schedule any downlink transmissions to the UE 110 via the SCell 122B for the duration of the NAV timer. In another exemplary embodiment, the PCell 122A may instruct the SCell 122B to place its LTE-LAA transmitter into low power mode until it is determined that the unlicensed band is idle or until the SCell 122B switches to a different unlicensed band.

It should be understood that using CCA to snoop for RTS/CTS frames and decoding the RTS/CTS frames is a more reliable and robust method of detecting busy bands than energy based LBT. This is because, as described above, energy based LBT can experience situations where the power of the signal fluctuates and crosses a busy/idle threshold erroneously due to channel impairments or noise/interference whereas decoding the RTS/CTS frames requires a particular, predefined process.

In 430, the PCell 122A may transmit data decoded from the duration field to the UE 110. In an exemplary embodiment, the data may be transmitted via a control channel, such as a physical downlink control channel ("PDDCH"), which may carry downlink control information ("DCI"), such as sleep DCI, of the PCC served by the PCell 122A. As discussed above, the PCell 122A may be connected to the UE 110 on a primary component carrier via a band of the licensed spectrum.

It should be understood that data transmitted by the PCell 122A to the UE 110 may depend on the capabilities of the UE 110. In a first example, the UE 110 may be equipped to use the duration field data to determine a NAV timer value. As such, the PCell 122A may transmit the data decoded from the duration field to the UE 110, and the UE 110 may determine a NAV timer value based on the received data and place its LTE-LAA receiver into low power mode for the duration of the NAV timer value. In a second example, the UE 110 may not be equipped to set a NAV timer value based on duration field data. As such, the PCell 122A may transmit data instructing the UE 110 to place its LTE-LAA receiver into low power mode for a specified duration. The specified duration may be determined by the PCell 122A based on the duration field data. This duration will be related to the time that the SCell 122B will not be used to transmit data to the UE 110, so there is no need to have the LTE-LAA receiver of the UE 110 in a high power mode. Those skilled in the art would understand that placing the LTE-LAA receiver into low power mode may conserve battery life of the UE 110.

Figure 5:
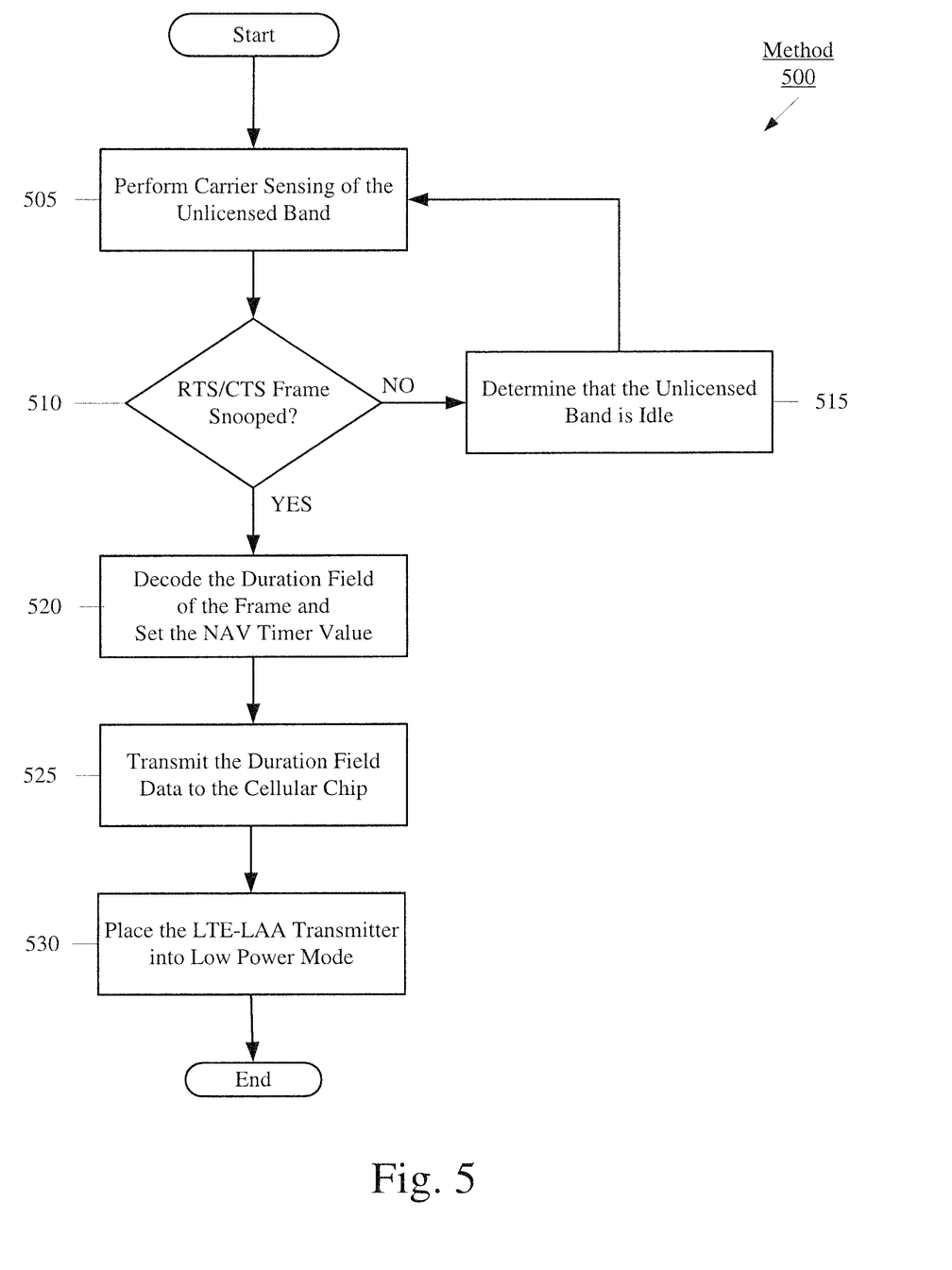
FIG. 5 shows a method of the UE using carrier sensing to enhance LBT functions according to various exemplary embodiments described herein.

FIG. 5 shows a method 500 for the UE 110 using carrier sensing to enhance LBT functions according to various embodiments described herein. In the exemplary embodiment, the UE 110 may be connected to the LTE-RAN 120 in carrier aggregation via the PCell 122A operating on the licensed band and the SCell 122B operating the unlicensed band.

In 505, the UE 110 may perform carrier sensing of the unlicensed band. The carrier sensing may be performed by the WiFi chip 235 of the UE 110. In an exemplary embodiment, the UE 110 may perform a CCA (clear channel assessment) of the unlicensed band. Specifically, the UE 110 may snoop for RTS and CTS frames being transmitted by other wireless devices, such as the UE 112, on the unlicensed band to which the UE 110 is connected to the SCell 122B.

In 510, the UE 110 may determine whether an RTS or a CTS frame has been snooped. If no RTS or CTS frames have been snooped, the UE 110 may proceed to 515 and determine that the unlicensed band is idle. As such, the UE 110 may exchange transmissions with the SCell 122B on the unlicensed band. The UE 110 may then loop back to 505 to once again perform carrier sensing of the unlicensed band.

If an RTS or a CTS frame has been snooped, the UE 110 may proceed to 520 and decode the duration field of the frame. The UE 110 may then set a NAV timer value based on the duration field of the frame. As discussed above, the NAV timer value may indicate how long the unlicensed band may remain busy.

In 525, the WiFi chip 235 may transmit the NAV timer value (or any raw data decoded from the duration field of the RTS/CTS frame) to the cellular chip 230 over the WCI 255. In 530, the cellular chip 230 may refrain from using the LTE-LAA transmitter for uplink communication and/or place the UE's LTE-LAA transmitter and/or receiver into low power mode for the duration of the NAV timer value. Again, since the channel is busy, the UE 110 will refrain from transmitting uplink data to the SCell 122B in the unlicensed band for the duration of the timer and, therefore, there is no need for the LTE-LAA transmitter of the UE 110 to be in a high power mode. In another exemplary embodiment, the UE's LTE-LAA transmitter may remain in low power mode past the expiration of the NAV timer value and until it is determined that the unlicensed band is idle or until the SCell 122B switches to a different band. Again, those skilled in the art would understand that placing the LTE-LAA receiver and/or transmitter into low power mode may conserve battery life of the UE 110.

It should be noted that although methods 400 and 500 perform LBT protocols via the CCA and NAV mechanism, those skilled in the art would be able to adapt methods 400 and 500 to also incorporate energy based LBT. For example, the PCell 122A or the UE 110 may perform the functions associated with the CCA/NAV mechanism only when the detected energy in the channel is within a certain range.

Figure 6:
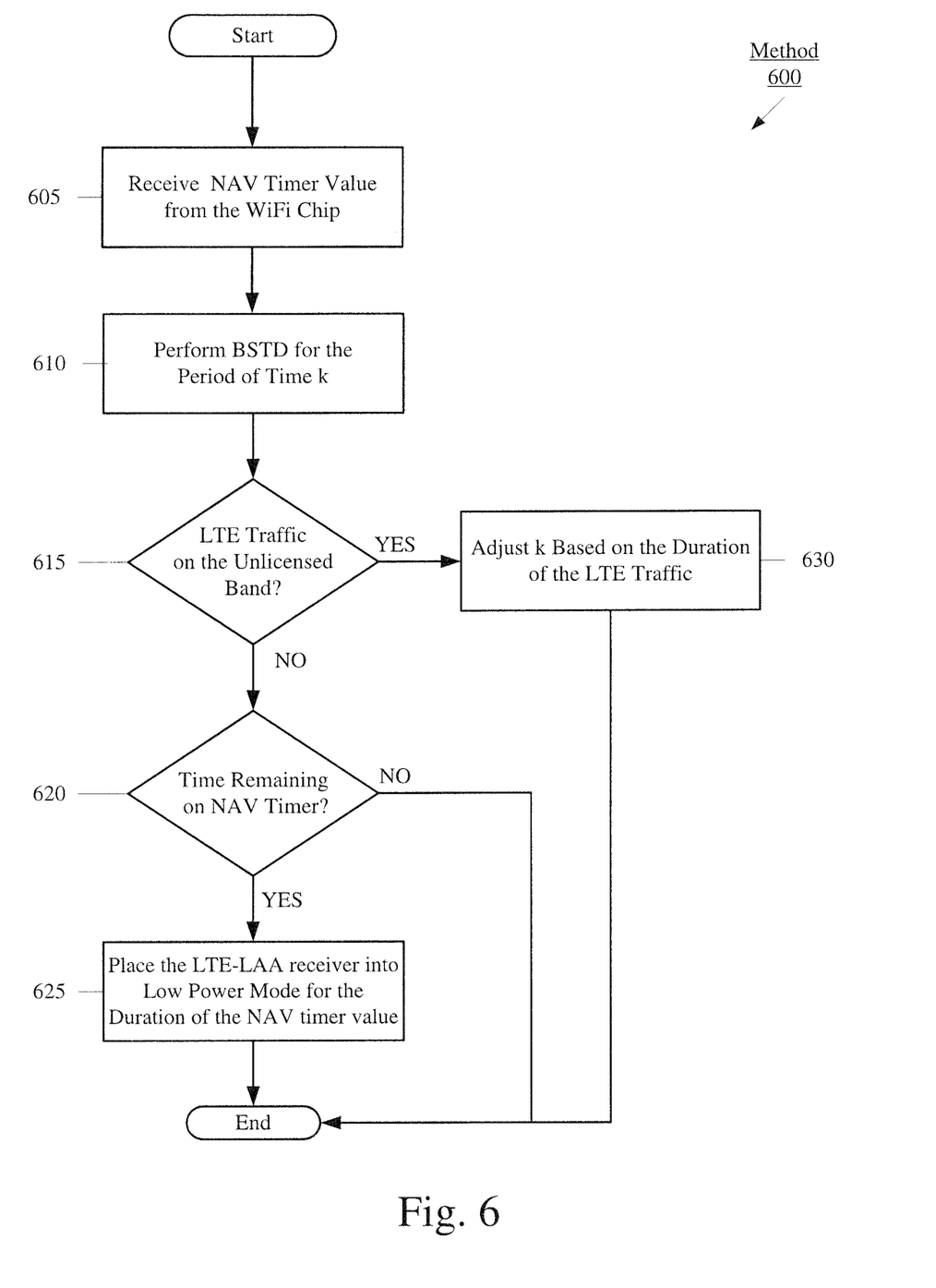
FIG. 6 shows a method the UE 110 using carrier sensing conserve battery life according to various exemplary embodiments described herein.

FIG. 6 shows a method 600 of the UE 110 using carrier sensing to further conserve battery life according to various embodiments described herein. In particular, method 600 may pertain to a scenario where the cellular chip 230 and the WiFi chip 235 share the same unlicensed band. For example, the UE 110 may be connected to the LTE network 120 and is operating under LAA carrier aggregation, where the PCell 122A is communicating with the UE 110 on the licensed band and the SCell 122B is communicating with the UE 110 on the unlicensed band, the UE 110 may also be connected to the WLAN 124 on the same unlicensed band as being used between the UE 110 and the SCell 122B.

In this scenario, the LTE-LAA receiver of the UE 110 may perform a blind signal type detection ("BSTD") to determine whether a signal over the unlicensed band is from the SCell 122B or from an access point associated with the WLAN 124. BSTD may be performed by the UE 110 via parameter estimation, such as estimating a signal to noise ratio or a signal transmission power, or via signal detection, such as decoding a physical channel. However, during BSTD, the LTE-LAA receiver of the UE 110 should operate in a full power mode to properly receive signals from the SCell 122B whereas the LTE-LAA receiver may transition to operate in a lower power mode if the signal is from the WLAN 124. As such, when the unlicensed band is busy due to transmissions from the WLAN 124, the LTE-LAA receiver of the UE 110 may waste power by remaining in full power mode.

In 605, the cellular chip 230 may receive a NAV timer value (or any raw data from decoded from the duration field of an RTS/CTS frame) from the WiFi chip 235 via the WCI 255. The NAV timer value may be determined in a manner similar to the exemplary embodiments discussed above. For example, the NAV timer may be determined by the WiFi chip 235 performing a CCA of the unlicensed band and snooping an RTS/CTS frame. In another exemplary embodiment, the NAV timer value may be determined when the WiFi chip 235 reserves the unlicensed band by performing the RTS/CTS protocol with the WLAN 124.

In 610, the cellular chip 230, which has been performing BSTD, may continue performing BSTD for a configurable time period k after receiving the NAV time value. For example, even though the UE 110 has determined that the channel is busy, it is not a guarantee that the SCell 122B will not transmit LTE traffic. Thus, 610 is a double check to confirm that there is no LTE traffic on the unlicensed band at least during the time period k. In another exemplary embodiment, the cellular chip 230 may continue performing BSTD until a non-LTE signal is detected by the cellular chip 230. For example, the cellular chip 230 may continue performing BSTD until a non-LTE signal is detected instead of during the time period k when an initial value for k has yet to be set.

In 615, the cellular chip 230 may determine whether any LTE traffic was received on the unlicensed band during the time period k. If no LTE traffic was received on the unlicensed band during the time period k, the cellular chip 230 may assume that there will be no LTE traffic for the period of the NAV timer. The method 600 may then move to 620, where the cellular chip 230 may determine whether the NAV timer has remaining time. For example, the cellular chip 230 may determine whether the NAV timer value has counted down to zero. If the NAV timer has not expired, the method 600 may proceed to 625, where the cellular chip 230 may place the LTE-LAA receiver into a low power mode for the duration of the NAV timer because, as stated above, the cellular chip 230 may assume there will be no LTE traffic (in the unlicensed band) for the duration of the timer because the channel is occupied. If the NAV timer has expired, the method 600 may end.

Returning to 615, if LTE traffic was received on the unlicensed band during the time period k, the method 600 may move to 630, where the cellular chip 230 may adjust the time period k based on self-learning mechanisms or algorithms. That is, even though the UE 110 determined the channel was busy, LTE traffic was still received on the unlicensed band. Thus, the cellular chip 230 does not want to turn off the LTE-LAA receiver too early and miss LTE traffic. This operation 630 is used to make sure such a situation does not occur.

In an exemplary embodiment, the self-learning mechanism may adapt the period k based on the duration of the LTE traffic received from the SCell 122B after the NAV timer value has been received. In an exemplary embodiment, if the LTE traffic was received, for example, between 3 ms and 5 ms after the NAV time value was received, the self-learning mechanism may also consider the time between when the NAV timer value was received and the start of the received traffic. The adjusted time period k may then be used when the cellular chip 230 receives another NAV timer value from the WiFi chip 235. In another exemplary embodiment, the self-learning mechanism may adjust the time period k based on a filter value of the duration of the LTE traffic. For example, the time period k may be adjusted based on an infinite impulse response ("IIR") filtered value of the duration of the LTE traffic.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    at a user equipment ("UE") operating in a carrier aggregation mode and connected to a first cell operating on a licensed band and a second cell operating on an unlicensed band, wherein the UE comprises an Industrial, Scientific, and Medical (ISM) chip and a cellular chip:
    performing a carrier sensing operation on the unlicensed band;
    determining, from the carrier sensing operation, a duration that the unlicensed band will be occupied;
    refraining from transmitting data to the second cell on the unlicensed band for the duration that the unlicensed band will be occupied; and
    setting a transmitter in communication with the second cell to a low power mode for the duration that the unlicensed band will be occupied, wherein the cellular chip sets the transmitter to the low power mode for the duration.

2. The method of claim 1, wherein the carrier sensing operation comprises a clear channel assessment.

3. The method of claim 1, wherein the duration is determined based on a duration field of a packet detected during the carrier sensing operation.

4. The method of claim 3, wherein the packet is one of a request to send ("RTS") packet or a clear to send ("CTS") packet.

5. The method of claim 1, further comprising:
setting a timer value based on the duration.

6. The method of claim 1, wherein the ISM chip performs carrier sensing and the determining of the duration, the ISM chip further transmitting the duration to the cellular chip.

7. A user equipment (UE), comprising:
a transceiver;
a cellular chip, wherein the transceiver and the cellular chip are configured to operate in a carrier aggregation mode where the UE connects to a first cell operating on a licensed band and a second cell operating on an unlicensed band; and
an Industrial, Scientific, and Medical (ISM) chip configured to perform a carrier sensing operation of the unlicensed band,
wherein one of cellular chip or ISM chip is further configured to determine, based on information from the carrier sensing operation, a duration that the unlicensed band will be occupied and transmit information associated with the carrier sensing operation to the cellular chip via a pathway connecting the ISM chip and the cellular chip, and
wherein the cellular chip and transceiver refrains from transmitting data to the second cell on the unlicensed band for the duration that the unlicensed band will be occupied.

8. The UE of claim 7, wherein the cellular chip is further configured to set a transmitter of the transceiver in communication with the second cell to a low power mode for the duration that the unlicensed band will be occupied.

9. The UE of claim 7, wherein the carrier sensing operation comprises a clear channel assessment.

10. The UE of claim 7, wherein the duration is determined based on a duration field of a packet detected during the carrier sensing operation.

11. The UE of claim 10, wherein the packet is one of a request to send ("RTS") packet or a clear to send ("CTS") packet.

12. The UE of claim 7, further comprising:
a timer having a timer value based on the duration.

13. The UE of claim 7, wherein the pathway is a Wireless Coexistence Interface (WCI) pathway.

* * * * *